Figure 1:
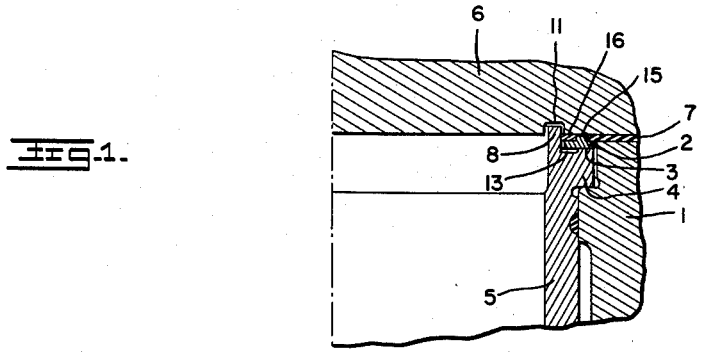

June 7, 1960     O. SCHILLING ET AL     2,939,753

CYLINDER HEAD GASKET ARRANGEMENT

Filed Oct. 10, 1958

INVENTORS
OTTO SCHILLING
KARL RANK
BY Dicke and Craig
ATTORNEYS

United States Patent Office 2,939,753
Patented June 7, 1960

2,939,753

CYLINDER HEAD GASKET ARRANGEMENT

Otto Schilling and Karl Rank, Stuttgart-Unterturkheim, Germany, assignors to Daimler-Benz Aktiengesellschaft, Stuttgart-Unterturkheim, Germany Filed Oct. 10, 1958, Ser. No. 766,593

Claims priority, application Germany Oct. 15, 1957

26 Claims. (Cl. 309—3)

The present invention relates to a cylinder head gasket arrangement for internal combustion engines in which the sealing edge, facing the hot combustion gases, is protected from the combustion gases by the metallic collar which projects into an annular groove in the cylinder head with clearance on all sides thereof.

The present invention essentially consists therein that the end collar which, in a manner known per se, protrudes from the top surface of the cylinder liner, centers a relatively thick, pressure resistant metallic ring member that rests on the radially outer portion of the cylinder liner flange and which clamps or tightens the cylinder liner flange between the cylinder head and a shoulder provided in the cylinder block.

The manufacture of the portion of the centering collar that projects into the annular groove of the cylinder head provides a significant structural simplification and the disposition of the metallic ring or sealing member which is preferably made of soft metallic material such as soft iron enables a positive clamping of the cylinder liner flange between the cylinder head and the cylinder block.

If the clamping surfaces on the cylinder liner flange and cylinder block are made of the same size and are arranged perpendicularly to the direction of the clamping forces and in alignment with each other in the direction of the forces, as is the case in the present invention, then no bending moment is exerted upon the liner flange that may lead to warping thereof and therewith to harmfully affect the sealing arrangement itself.

The metallic sealing ring member, according to the present invention, is provided on the top side thereof with an annular and flat bead that is displaced radially outwardly towards the outside of the ring member so that the clamping pressure exerted on the sealing ring member presses or forces particularly the outer portion of this ring against the upper clamping surface of the cylinder liner flange which is also radially displaced toward the outside of the liner flange.

Into the annular groove formed between the centering collar of the liner and the bead of the metallic sealing ring member a heat resistant, gas-tight sealing ring which is slightly resistant to the clamping pressure, preferably made of asbestos, is placed whereas a conventional gasket normally found between cylinder head and cylinder block is provided on the metallic ring radially outwardly from the annular bead thereof between the cylinder head, on the one hand, and the metallic sealing ring and the cylinder block on the other hand. Furthermore, the clearances or separating joints between the cylinder liner and the cylinder block within the region of the cylinder liner flange and below the same are sealed by means of a further gasket, preferably made of rubber, which is inserted or let into the cylinder liner wall or in the wall of the cylinder block below the liner flange to prevent steam from passing therethrough.

Cylinder liners having an annular collar projecting from the top face thereof and which center a thin metallic sealing ring are known. However, these centering collars of known construction do not project into an annular groove of the cylinder head but into a recess of the cylinder head which is part of or enlarges the combustion space.

Furthermore, in such known constructions, the cylinder liner flange is not rigidly clamped, in the sense of the present invention, by the use of a thin metal ring, which acts as a sealing ring, but the thin metal ring solely serves as a sealing abutment for a spring pressure acting on the underside of the liner flange. A double seal in the sense of the present invention is not provided with the known constructions.

The subject matter of the present invention has also no relationship with the known resilient seals which are usually inclosed in thin walled metal jackets or covers provided at the places where gases may pass therethrough. Such metal jackets or covers are, in themselves, too weak to transmit large clamping pressures.

Furthermore, it is also already known to provide cone-shaped or converging collars on the cylinder liners which project into a correspondingly shaped annular groove in the cylinder head by means of which a seal, placed at the bottom of the groove, is protected from the hot gases. Aside from the fact that in such a case no double sealing is provided, the wedging action of the cone-shaped cylinder liner collar leads to or favors the formation of cracks, particularly in the corners at the bottom of the groove.

Accordingly, it is an object of the present invention to provide a cylinder head seal for internal combustion engines that is structurally simple and reliable in operation.

A further object of the present invention resides therein that two seals are provided, one of which is used as seal against the hot gases, while the other one as seal against the cooling fluid.

A still further object of the present invention resides therein that a relatively thick pressure-resistant metallic ring is inserted between the cylinder head and the cylinder liner flange to thereby positively transmit the clamping forces from the cylinder head to the cylinder liner.

Still another object of the present invention resides therein that the sealing edges facing the hot combustion gases are protected by a metallic collar protruding from the cylinder liner into an annular groove in the cylinder head.

Another object of the present invention is to provide a cylinder head sealing arrangement which does not produce a bending force upon the cylinder liner flange when the cylinder head is tightened.

Figure 2:
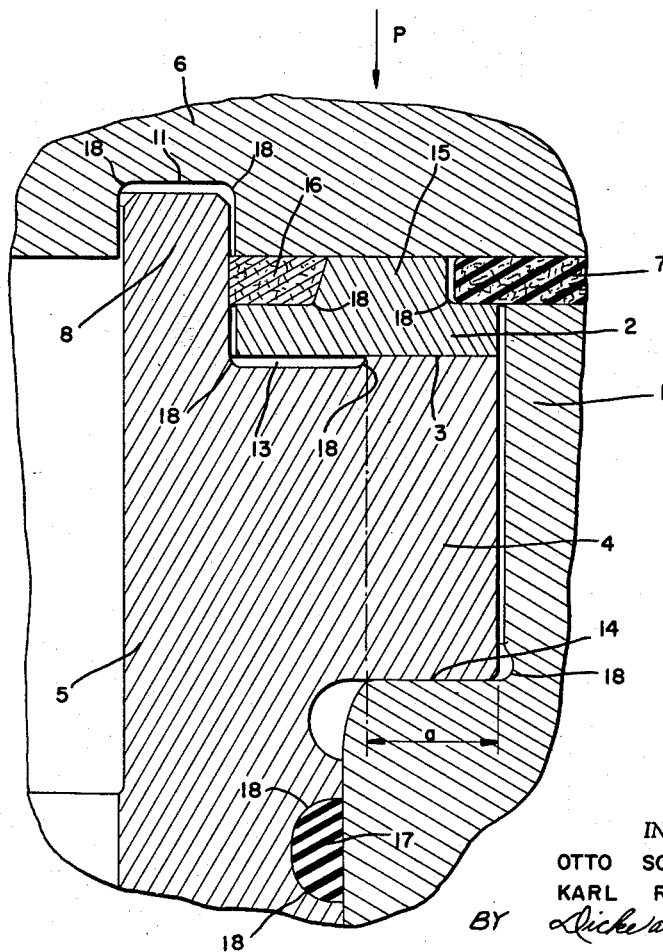

These and other objects, features and advantages of the present invention will become more obvious from the following description when taken in connection with the accompanying drawing, which shows, for purposes of illustration only, one preferred embodiment of the present invention, and wherein:

Figure 1 is a partial cross sectional view through a cylinder head gasket arrangement of an internal combustion engine in accordance with the present invention taken in a plane parallel to the cylinder axis, and Figure 2 is an enlarged partial cross sectional view of the portion defined by the area A in Figure 1.

Referring now to the drawing, wherein like reference numerals are used throughout the various views to designate like parts, reference numeral 5 designates the cylinder liner, reference numeral 6 the cylinder head and reference numeral 7 the usual resilient seal between cylinder head 6 and cylinder block 1. The annular groove in the cylinder head 6 is designated by reference numeral 11, According to the present invention the metal ring which projects into the annular groove 11 forms an integral part of the cylinder liner 5 and centers as a collar 8 projecting from the top end thereof a relatively thick sealing ring member that rests on an outer clamping surface 3 provided at the outer portion of the cylinder liner flange 4. The width of the clamping surface 3 is determined by the width of an annular groove 13 which is provided directly adjacent the centering collar 8 in the surface of the liner flange 4. The width of the groove 13 corresponds to approximately half the total width of the shoulder between the centering collar 8 and the outer circumference of the flange 4, so that the inner half of the metallic sealing ring 2 projects freely over the annular groove 13. The underside of the cylinder liner flange 4 rests on a counter shoulder 14 provided in the cylinder block 1, and the width of this counter shoulder 14 is substantially, preferably exactly the same as the width of the clamping surface 3 at the flange top side and as indicated by the reference character $a$ in Figure 2. Moreover the flat flange surfaces 3 and 14 are disposed perpendicularly to the direction of the clamping forces P exerted thereon by the cylinder head and are also in alignment with each other in the direction of the clamping forces. In this manner provision is made so that the force P does not in any way produce a bending moment upon the flange 4.

The metallic sealing ring member 2 is provided with a flat annular bead 15 along the side thereof adjacent to the cylinder head 6. This annular bead 15 is arranged thereon displaced somewhat towards the outside of the ring member 2 so that the clamping force or pressure P exerted by the cylinder head presses the ring member 2 forcibly and strongly, in particular, against the clamping surface 3 of the cylinder liner flange 4.

A heat resistant and gas-tight asbestos seal 16 resilient with respect to the clamping force is placed into the annular groove defined by the centering collar 8 and the annular bead 15 whereas a conventional seal 7 is placed between the cylinder head 6 and the cylinder block 1 on the ring member 2 radially outwardly from the annular bead 15. In order to prevent, with liquid-cooled internal combustion engines, the steam from entering into the seal from below, that is in the direction coming from the liquid-filled cooling jackets thereof, a rubber seal 17 is further provided in the wall 5 of the cylinder liner or in the wall of the cylinder block 1 below the flange 4 of the cylinder liner. In order to prevent the formation of harmful cracks or rending, the corners produced by the changes in the cross-section of the cylinder head, cylinder block, cylinder liner and seal, are more or less rounded off in a known manner. Some of these rounded-off corners are designated in Figure 2 by reference numeral 18.

While we have shown only one embodiment in accordance with the present invention, it is understood that the same is not limited to the details thereof, shown herein only for purposes of illustration, but is susceptible for many changes and modifications within the spirit and scope of the present invention and, accordingly, we intend to cover all such changes and modifications as encompassed by the scope of the appended claims.

We claim:
1. A cylinder head gasket construction for sealing the separating joint formed between a cylinder block and a cylinder head provided with groove means of an internal combustion engine, comprising a cylinder liner provided with collar means extending therefrom into said groove means with clearance to thereby protect the sealing edge facing the combustion chamber against the combustion gases, and with flange means disposed outwardly of said collar means and forming an outer clamping surface, shoulder means provided in said cylinder block, and relatively thick sealing ring means centered by said collar means and disposed intermediate said cylinder head and said flange means of said cylinder liner and operative to effectively clamp said cylinder liner between said cylinder head and said shoulder means of said cylinder block when said cylinder head is secured to said cylinder block.

2. A cylinder head gasket construction according to claim 1, wherein said collar means extends into said groove means with play on all sides thereof.

3. A cylinder head gasket construction according to claim 1, wherein said sealing ring means is made of a pressure-resistant material.

4. A cylinder head gasket construction according to claim 3, wherein said pressure-resistant material is soft iron.

5. A cylinder head gasket construction according to claim 1, wherein said clamping surface on said flange means and said shoulder means in said cylinder block are of essentially the same radial width and are arranged one directly above the other.

6. A cylinder head gasket construction according to claim 1, wherein said clamping surface and said shoulder means are of essentially the same width.

7. A cylinder head gasket construction according to claim 1, wherein said clamping surface and said shoulder means are essentially aligned in the axial direction of said cylinder block.

8. A cylinder head gasket construction according to claim 1, wherein said cylinder liner is provided with a relatively shallow annular groove determining the radial width of said outer clamping surface.

9. A cylinder head gasket construction according to claim 8, wherein the radial width of said annular groove is substantially the same as the radial width of said clamping surface.

10. A cylinder head gasket construction according to claim 1, wherein said sealing ring means includes an annular flat bead on the top side thereof for transmitting the tightening pressure exerted by said cylinder head on said ring means.

11. A cylinder head gasket construction according to claim 10, wherein said annular bead is displaced outwardly.

12. A cylinder head gasket construction for sealing the separating joint formed between a cylinder block and a cylinder head provided with groove means of an internal combustion engine, comprising a cylinder liner provided with collar means extending therefrom into said groove means with clearance to thereby protect the sealing edge facing the combustion chamber against the combustion gases and with flange means disposed outwardly of said collar means and forming an outer clamping surface, shoulder means provided in said cylinder block, relatively thick sealing ring means centered by said collar means and disposed intermediate said cylinder head and said flange means of said cylinder liner and operative to effectively clamp said cylinder liner between said cylinder head and said shoulder means of said cylinder block when said cylinder head is secured to said cylinder block, said sealing ring means including an annular flat bead on the top side thereof for transmitting the tightening pressure exerted by said cylinder head on said ring means, said annular bead being displaced outwardly, resilient, heat-resistant gasket means between said collar means and said bead, and second gasket means disposed radially outwardly on said ring means adjacent to the bead thereof and intermediate said cylinder head, on the one hand, and said cylinder block, on the other.

13. A cylinder head gasket construction according to claim 12, wherein said heat-resistant gasket means is made of asbestos, and wherein said second gasket means is made of a rubber-asbestos composition.

14. A cylinder head gasket construction according to claim 13, further comprising gasket means in the wall of said cylinder liner and below said flange means and shoulder means for sealing the clearance between said liner and said cylinder block.

15. A cylinder head gasket construction for sealing the separating joint formed between a cylinder block and a cylinder head provided with groove means of an internal combustion engine, comprising a cylinder liner provided with collar means extending therefrom into said groove means with clearance to thereby protect the sealing edge facing the combustion chamber against the combustion gases and with flange means disposed outwardly of said collar means and forming an outer clamping surface, shoulder means provided in said cylinder block, relatively thick sealing ring means centered by said collar means and disposed intermediate said cylinder head and said flange means of said cylinder liner and operative to effectively clamp said cylinder liner between said cylinder head and said shoulder means of said cylinder block when said cylinder head is secured to said cylinder block, and gasket means in the wall of said cylinder liner and below said flange means and shoulder means for sealing the clearance between said liner and said cylinder block.

16. A cylinder head gasket construction according to claim 15, wherein said last-mentioned gasket means is made of rubber.

17. A cylinder head gasket construction for sealing the separating joint formed between a cylinder block and a cylinder head provided with groove means of an internal combustion engine, comprising a cylinder liner provided with collar means extending therefrom into said groove means with clearance on all sides thereof and with flange means disposed outwardly of said collar means and forming a clamping surface, shoulder means provided in said cylinder block, and means including a relatively thick, pressure-resistant sealing ring means centered by said collar means and disposed intermediate said cylinder head and said flange means to clamp said cylinder liner between said cylinder head and said shoulder means of said cylinder block upon tightening said cylinder head onto said cylinder block.

18. A cylinder head gasket construction for sealing the separating joint formed between a cylinder block and a cylinder head provided with groove means of an internal combustion engine, comprising a cylinder liner provided with collar means extending therefrom into said groove means with clearance on all sides thereof and with flange means disposed outwardly of said collar means and forming a clamping surface, shoulder means provided in said cylinder block, means including a relatively thick, pressure-resistant sealing ring means centered by said collar means and disposed intermediate said cylinder head and said flange means to clamp said cylinder liner between said cylinder head and said shoulder means of said cylinder block upon tightening said cylinder head onto said cylinder block, said collar means being formed integrally with said cylinder liner, said sealing ring means being provided with an annular bead extending in the direction toward said cylinder head, and first and second gasket means on said sealing ring means disposed respectively intermediate said collar means and said annular bead and outwardly of said annular bead.

19. A cylinder head gasket construction according to claim 18, wherein said cylinder liner is provided with a shallow groove radially adjacent said collar means and delimiting the width of said clamping surface, and further seal means intermediate said cylinder liner and cylinder block.

20. A cylinder head gasket construction according to claim 19, wherein said first gasket means is made of asbestos material and said further seal means of rubber, wherein said clamping surface and said shoulder means are in essential alignment in the axial direction of the cylinder, and wherein the corners of said shallow groove are rounded off.

21. A cylinder head gasket construction for an internal combustion engine comprising a cylinder liner provided with flange means forming a clamping surface at the radially outer portion thereof for clamping said liner between the cylinder head and the cylinder block of said engine, means for sealing the separating joint between said flange means and said cylinder head, and means for protecting the sealing edge of said separating joint facing the combustion chamber against the combustion gases, said protecting means including groove means in said cylinder head and collar means provided on said liner extending therefrom into said groove means with clearance on all sides thereof, said sealing means including relatively thick metallic ring means having a relatively large radial width and centered by said collar means disposed intermediate said cylinder head and said flange means, said ring means being in contact with the radially outer portion of said flange means constituting said clamping surface and provided with an annular raised portion thereon facing said cylinder head, resilient and fireproof sealing means disposed between said raised portion and said collar means, and shoulder means provided in said cylinder block, said ring means being operative, on the one hand, to effectively clamp said flange means between said cylinder head and said shoulder means of said cylinder block, and, on the other hand, to compress said fireproof sealing means between said ring means, said collar means and said cylinder head when said cylinder head is secured to said cylinder block.

22. A cylinder head gasket construction according to claim 21, wherein the contact surface between said ring means and said flange means and the contact surface between the flange means and said shoulder means are of essentially the same size, are perpendicular to the direction of clamping, and are aligned in the axial direction of said cylinder block.

23. A cylinder head gasket construction according to claim 21, wherein said cylinder liner is provided with a relatively shallow annular recess adjacent said collar means determining the radial width of said outer clamping surface so that the radial width of said annular recess and the radial width of said clamping surface are substantially equal.

24. A cylinder head gasket construction according to claim 21, further comprising gasket means in the wall of said cylinder liner and below said flange means and shoulder means for steam-tight sealing the clearance between said liner and said cylinder block.

25. A cylinder head gasket construction according to claim 21, further comprising second gasket means disposed radially outwardly on said ring means adjacent the raised portion thereof and intermediate said cylinder head and said cylinder block.

26. A cylinder head gasket construction according to claim 21, wherein said metallic ring means is made of soft iron, said resilient and fireproof sealing means being made of asbestos, said gasket means being made of rubber-like material while said second gasket means is made of a rubber-asbestos composition.

References Cited in the file of this patent

FOREIGN PATENTS

| 832,520 | Germany | Feb. 25, 1952 |
| 918,725 | Germany | Oct. 4, 1954 |